(12) United States Patent
Hattori (10) Patent No.: US 6,560,058 B1
(45) Date of Patent: May 6, 2003

(54) POSITIONING CONTROL DEVICE, CHANGEABLE MAGNETIC DISC DEVICE, AND HEAD CONTROL METHOD

(75) Inventor: Toshiro Hattori, Tokyo (JP)

(73) Assignee: TDK Corporation (JP)

( * ) Notice: Subject to any disclaimer, the term of this patent is extended or adjusted under 35 U.S.C. 154(b) by 0 days.

(21) Appl. No.: 09/427,974

(22) Filed: Oct. 27, 1999

(30) Foreign Application Priority Data

Oct. 28, 1998 (JP) .............................. 10-321354

(51) Int. Cl.⁷ .............................. G11B 5/596
(52) U.S. Cl. .................................... 360/77.08
(58) Field of Search .............. 360/77.08, 75, 360/40, 29

(56) References Cited

U.S. PATENT DOCUMENTS

| | | | | |
|---|---|---|---|---|
| 5,264,771 A | * | 11/1993 | Kawauchi | 318/685 |
| 5,828,516 A | * | 10/1998 | Park | 360/77.08 |
| 5,867,341 A | * | 2/1999 | Volz et al. | 360/77.02 |
| 5,867,342 A | * | 2/1999 | Hattori | 360/77.04 |
| 6,356,519 B1 | * | 3/2002 | Wakuda et al. | 369/44.28 |

FOREIGN PATENT DOCUMENTS

| | | | |
|---|---|---|---|
| JP | 2244467 | 9/1990 | G11B/21/10 |
| JP | 3-225684 | 10/1991 | G11B/21/10 |
| JP | 9-63218 | 3/1997 | G11B/21/10 |
| JP | 9198816 | 7/1997 | G11B/21/10 |
| JP | 9-293342 | 11/1997 | G11B/21/10 |
| JP | 9-312074 | 12/1997 | G11B/21/10 |

* cited by examiner

Primary Examiner—David Hudspeth
Assistant Examiner—K. Wong
(74) Attorney, Agent, or Firm—Hayes Soloway PC (57) ABSTRACT

A positioning control device is provided which is capable of avoiding the limit cycle in which the head moves back and forth between two dead zones on both sizes of the center of the target track. When a magnetic head is in the dead zone and the head position is separated from the center of the target track, the center position of the dead zone is set as the head position.

15 Claims, 4 Drawing Sheets

21: SERVO REGION

POSITIONING CONTROL DEVICE, CHANGEABLE MAGNETIC DISC DEVICE, AND HEAD CONTROL METHOD

BACKGROUND OF THE INVENTION

1. Field of the Invention

The present invention relates to a positioning control device for controlling the positioning of a head for reading/writing on mediums, a changeable magnetic disc device, and a method for controlling the head, and particularly relates to a positioning control device for controlling positioning of the head for reading/writing on the mediums such as changeable discs etc, a changeable magnetic disc device, and a method for controlling the head.

2. Background Art

One example of conventional positioning device, changeable magnetic disc device, and a head control method is disclosed in Japanese Patent Application, First Application No. Hei 9-198816. The devices control the positioning so that a width W of the magnetic head for reading a burst pattern satisfies the following equation;

$$P+e \leq W \leq 2P-e$$

wherein, P represents a pitch of the burst pattern in the radial direction of a disc, and e represents a width of an erasing band in the radial direction of the disc.

However, a problem is encountered that, although the conventional technique can prevent from generating a dead zone in the burst signals, it has not been possible to use a magnetic head having a smaller track width than a half (½) of the track pitch.

The other problem arises that, when reading a wide track by a narrow head in order to maintain the lower order compatibility, a phenomenon called a limit cycle is likely to be caused in which the head moves back and forth between dead zones located on both sides of the target track center.

The present invention is attained in order to solve the above problems. The object of the present invention is to provide a positioning device of the head position for positioning the head at the center of the dead zones, a changeable magnetic disc device, and a method for controlling the head; wherein the head positioning device is capable of positioning the head at the center of the dead zone, when the head is in the dead zone and when the position between the target track center and the head is separated; thus it is possible to avoid the limit cycle which is the back and forth motion of the head between dead zones located on both sides of the target track center, and it is possible to maintain lower order compatibility.

SUMMARY OF THE INVENTION

The first aspect of the present invention provides a positioning control device for controlling positioning of a head that reads and writes on a medium comprising: a phase compensation filter for ensuring stability of positioning of said head that reads and writes the changeable medium; and a position error signal generating device for generating the position error signal for obtaining the position of the dead zone, when the head is in said dead zone in which the change of the position error signal is within a specified range or the position error signal does not change, even if said head moves, based on a combination of burst signals for generating a position error signal which indicates a relative position of said head to said medium.

The second aspect of the present invention provides a positioning control device for controlling positioning of a head that reads and writes on a medium comprising: a phase compensation filter for ensuring the stability of the positioning of said head that reads and writes on the changeable medium; and a position error signal generating device for generating the position error signal for obtaining the position of the dead zone, when the head is in said dead zone in which the change of the position error signal is within a specified range or the position error signal does not change, even if said head moves, based on a combination of the burst signals for generating a position error signal which indicates a relative position of said head to said medium and a track number written on said medium.

The third aspect of the present invention provides a positioning control device according to the first or the second aspect, wherein, if said head is located at a position separated more than a half track from the target track center, the positioning control device determines that the head position is present at the center portion of said dead zone.

The fourth aspect of the present invention provides a positioning control device according to the first or the second aspect, wherein, if said head is located at a position closer than a half track to the target track center, and when the track number of said head changes as a result of obtaining two samples of servo signals, the positioning control device determined that the head position is located at the center region of the dead zone.

The fifth aspect of the present invention provides a positioning control device according to the first or the second aspect, wherein, if said head is located at a position closer than a half track to the target track center, and if the track number of said head does not change as a result of obtaining two samples of servo signals, the positioning control device determines that the head position is located at a position closest to the target track center of the dead zone.

The sixth aspect of the present invention provides a positioning control device comprising a head for reading and writing on the exchangeable medium and a positioning control device according to the first or the second aspect of the present invention.

The seventh aspect of the present invention provides a method of controlling positioning of a head which executes reading and writing on the medium, the method comprises: a phase compensating step for preserving the stability of positioning of the head for reading and writing on the changeable medium; and a position error signal generating step for generating the position error signal for obtaining the position of the dead zone, when the head is in said dead zone in which the change of the position error signal is within a specified range or the position error signal does not change, even if said head moves, based on a combination of burst signals for generating a position error signal which indicates a relative position of said head to said medium.

The eighth aspect of the present invention provides a method of controlling positioning of a head which execute reading and writing on the medium, the method comprises: a phase compensating step for preserving the stability of positioning of the head for reading and writing on the changeable medium; and a position error signal generating step for generating the position error signal for obtaining the position of the dead zone, when the head is in said dead zone in which the change of the position error signal is within a specified range or the position error signal does not change, even if said head moves, based on a combination of burst signals for generating an position error signal which indicates a relative position of said head to said medium and a track number written on said medium.

The ninth aspect of the present invention provides a method of controlling the position of said head according to the seventh aspect, wherein, if said head is located at a position separated by more than a half track from the target track center, the head position is determined to be present at the center portion of said dead zone.

The tenth aspect of the present invention provides a method of controlling the position of the head according to any one of claims 7 and 8, wherein, if said head is located at a position closer than a half track from the target track center, and if the track number of said head does not changes as a result of obtaining two samples of servo signals, the positioning control device determines that the head position is located at a position closest to the target track center of the dead zone.

The eleventh aspect of the present invention provides a method of controlling the position of the head according to any one of claims 7 and 8, wherein, if said head is located at a position closer than a half track to the target track center, and if the track number of said head does not changes as a result of obtaining two samples of servo signals, the positioning control device determines that the head position is located at a position closest to the target track center of the dead zone.

DETAILED DESCRIPTION OF THE INVENTION

Figure 1:
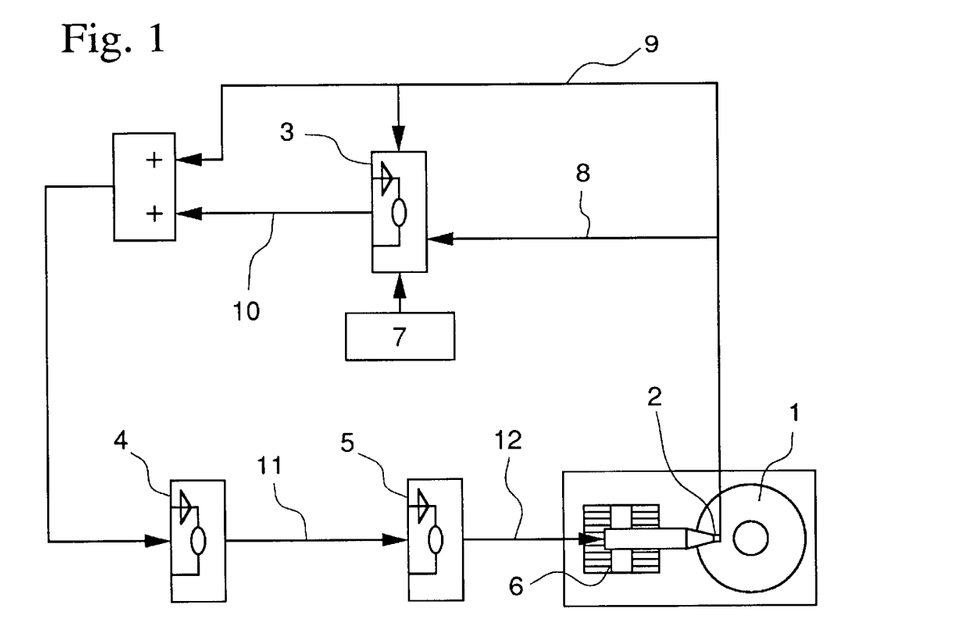
FIG. 1 is a block diagram showing an embodiment of the positioning control device of the present invention.
Figure 2:
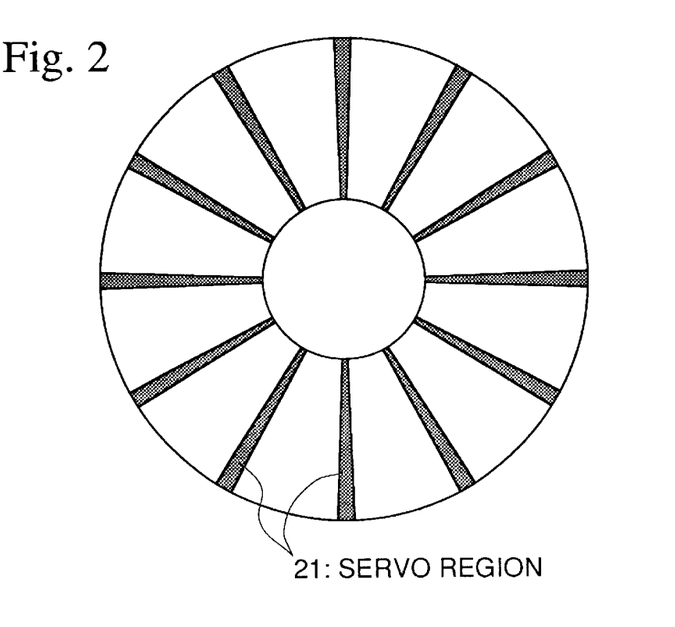
FIG. 2 is a diagram showing the servo regions of a disc medium which can be used for the positioning control device shown in FIG. 1.

Hereinafter, the first embodiment of the present invention is described with reference to the attached drawings. FIG. 1 is a block diagram illustrating a positioning device according to the first embodiment of the present invention. FIG. 2 shows an example of the servo regions 21 of a disc medium which can be used for the positioning control device shown in FIG. 1, and FIG. 3 shows the relationship between the position error signal and the burst signal used for the head control method of the present invention applied to the positioning control device shown in FIG. 1.

Figure 3:
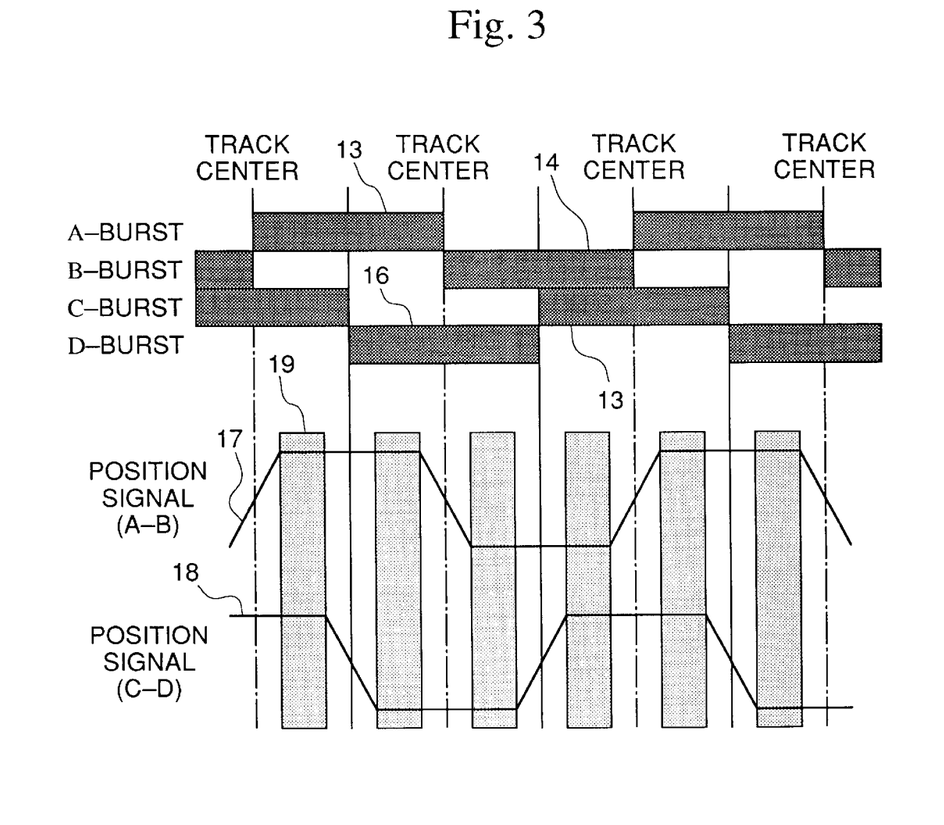
FIG. 3 is a diagram showing the relationship between the position error signal and the burst signal used for the head control method of the present invention applied to the positioning control device shown in FIG. 1.

The positioning control device, as shown in FIGS. 1 and 3, increases the positioning speed of the head 2 by setting the head position 20 at the center of the dead zone 19; has a function for preventing the limit cycle by setting the head position 20 at the target track center in the dead zone 19, when the head 2 is located in the dead zone 19 at the central position of the target track; and has a the positioning control device comprising a position error signal generator 3, a phase compensation filter 4, a power amplifier 5, an actuator 6 and a memory 7.

The phase compensation filter preserves the positioning stability of the magnetic head 2 for reading and writing on the changeable medium (medium 1 such as changeable magnetic disc).

The positioning error signal generator 3, having a dead zone 19, in which fluctuation of the positioning error signal 10 falls in a predetermined range or no fluctuation of the positioning error signal 10 is observed even when the magnetic head has moved, generates the positioning error signal 10 for obtaining the position of the dead zone 19 where the magnetic head 2 is located, based on a combination of burst signals for generating the position error signal 10 showing the relative position between the changeable magnetic disc 1 and the magnetic head 2.

The positioning error signal generator 3, having a dead zone 19, in which fluctuation of the positioning error signal 10 falls in a predetermined range or no fluctuation of the positioning error signal 10 is observed even when the head 2 has moved, generates the positioning error signal 10 for obtaining the position of the dead zone 19 where the magnetic head 2 is located, based on a combination of the burst signal and the track number 9 for generating the position error signal 10 showing the relative position between the changeable magnetic disc 1 and the magnetic head 2.

This positioning control device judges that the head position is the central portion of the dead zone 19, when the magnetic head 2 is located separated more than a half (½) track width from the center of the target track. Furthermore, the positioning control device judges that the head position is the central portion of the dead zone 19, when the magnetic head is located at the position closer than a half track width, and when the track number 9 of the magnetic head changes as a result of obtaining two samples of the servo signal 8. In addition, the positioning control device judges that the head position is the nearest position of the center of the dead zone 19, when the magnetic head is located at the position closer than half a track width, and the track number 9 of the magnetic head does not change as a result of obtaining two samples of servo signals 8.

The changeable magnetic disc device is compatible to the changeable medium (medium 1 such as changeable magnetic disc), and particularly has a function for reading a low order medium by a higher order device, and the changeable magnetic device comprises a positioning control device and a head 2.

In general, the servo signals 8 are written in the servo area 21 which extends in the radial direction of the disc. A position error signal 10, which indicates the relative position of the changeable disc 1 and the head 2, is discretely obtained by reading the servo signals 8 by the head.

A sector servo system by means of the burst signal, generally used in the magnetic disc device, is used as the servo signals 8. In the sector servo system using the burst signals, four burst signals are used, including A-burst signal 13, B-burst signal 14, C-burst signal 15, and D-burst signal 16, which are arranged as shown in FIG. 3, and the head position can be detected by fluctuation of the output magnitude of the magnetic head by using the fact that the output magnitude fluctuates with the width of the magnetic head 2 which overlaps on the burst signal area.

At this time, the position error in the track center is detected by the difference between the A-burst signal 13 and the B-burst signal 14 (corresponding to the position error signal (A-B) in FIG. 3), and the position error in the space between tracks is detected by the difference between the C-burst signal 15 and the D-burst signal 16 (corresponding to the position error signal (C-D) in FIG. 3).

The reason for using such a detection method is to reduce the effect of the insensitive zone in which the position error signal 10 becomes insensitive to the movement of the magnetic head generated near the center of the burst signals due to the narrower track width compared to the influence of the output turbulence at the end of the burst signal or the track pitch.

Hereinafter, the zone in which the position error can be detected irrespective of the head position, is called the position error detection zone, and a zone in which position error signal 10 does not change if the magnetic head 2 moves, that is, the zone not capable of detecting the position error, is called the dead zone 19.

The position error detection zone has the same width as that of the head track, and the width of the dead zone is obtained by subtracting the width of the head track from a half of the track pitch. When the track pitch is 10 $\mu$m, and the head track width is 4 $\mu$m, the width of the error detection zone is calculated as 4 $\mu$m, and the width of the dead zone is calculated as 1 $\mu$m. Thus, if the head track width is more than a half of the track pitch, it is possible to detect the position error of the magnetic head 2 regardless of the position 20 of the magnetic head 2. However, if the track width is smaller than a half of the track pitch, the dead zone 19 is present as shown in FIG. 3.

On the changeable magnetic disc 1, servo signals are written on the servo regions 21 which extend in the radial direction as shown in FIG. 2. The positioning error signals, indicating the relative position of the magnetic head, are discretely obtained by reading the servo signals 8 using the magnetic head 2.

There are three modes in the operation of the positioning control device of the magnetic head 2. That is, these three modes include a follow mode in which the magnetic head 2 follows centering on the target track, a seek mode in which the magnetic head 2 is made to move on the other track, and a settling mode in which the magnetic head is made to move on the target track from the other track for shifting from the seek mode to the follow mode.

Since, in the follow mode, the magnetic head 2 follows centering on the target track and since, in the seek mode, the magnetic head 2 is made to move by reading the track number written on the medium, it is not likely that the follow mode and the seek mode are influenced by the dead zone 19. In contrast, in the settling mode, since the magnetic head 2 is moved precisely centering on the target track passing the dead zone 19, the influence of the dead zone 19 is inevitable.

In the positioning control device according to the present embodiment, when implementing the settling mode, the magnetic head 2 reads the servo signals 8 written on the changeable magnetic disc 1, after converting the servo signals to the position error signals 10 by the position error signal generator 3, and the position error signals 10 are sent to the phase compensator (the phase compensation filter) 4.

At this time, the track number 9 is also obtained by the magnetic head and the difference with respect to the target track number is sent to the phase compensator (the phase compensation filter) 4.

Figure 4:
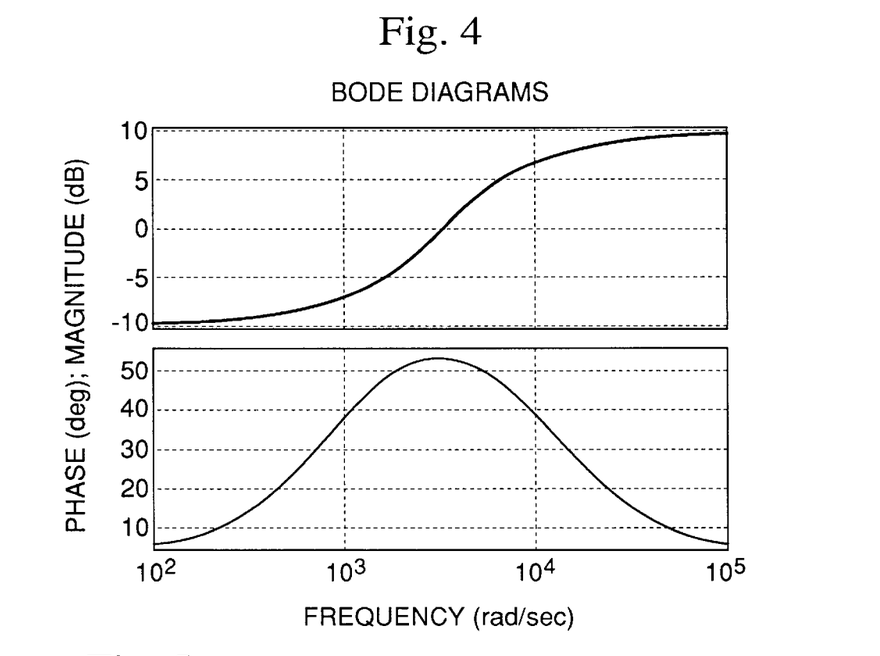
FIG. 4 is a diagram showing an example of the frequency characteristics of the phase compensation filter used in the head control method of the present invention applied to the positioning control device shown in FIG. 1.

FIG. 4 shows an example of frequency characteristics (BODE diagram) of the phase compensation filter used for the head control method executed in the positioning control device 4 shown in FIG. 1. The phase compensator (the phase compensation filter) 4 comprising integrated algorithms for executing the positioning control of the magnetic head 2 just like a phase gain and the delay compensator having the frequency characteristics as shown in FIG. 4, outputs the actuator control signal 11 to a power amplifier 5, an actuator driving current signal 12 from the power amplifier 5 is input into an actuator 6, and the actuator 6 moves the magnetic head 2.

The position error signal generator 3 calculates the distance of the head 2 from the target track center and generates the position error signal 10. However, the position error signal cannot be obtained from the servo signals 8 in the dead zone 19. As shown in FIG. 3, it should be noted that the dead zone is separated into two on the same track, and on the same track, the C-D position error signals 18 on two dead zones are identical, but the A-B position error signals on two dead zones 17 differ from each other. Accordingly, if the status pattern of the A-B position error signal 17 is distinct, it is possible to identify whether the magnetic head 2 is located at the outside or inside against the track center.

Since the A-B position error signal 17 changes periodically, it is also possible to identify the location by judging the status pattern of the A-B position error signal 17 by identifying the track number 9. In addition, since the status of the C-D position error signal 18 shows a different pattern from that of the A-B position error signal 17, it is also possible to identify the location by checking the status of the C-D position error signal 18.

As described above, when the magnetic head is located in the dead zones, it is not possible to obtain the accurate positional error between the head 2 and the target track center, but it is possible to identify whether the magnetic head is located at the inside or outside with respect to the target track center.

Figure 5:
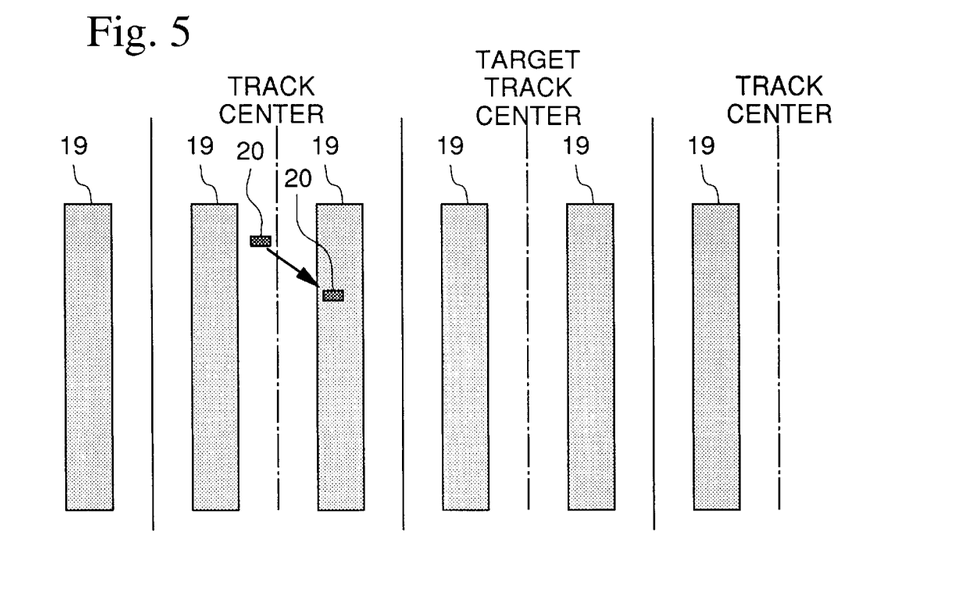
FIG. 5 is a diagram showing the first embodiment of the head movement executed in the head control method of the present invention applied to the positioning control device shown in FIG. 1.
Figure 6:
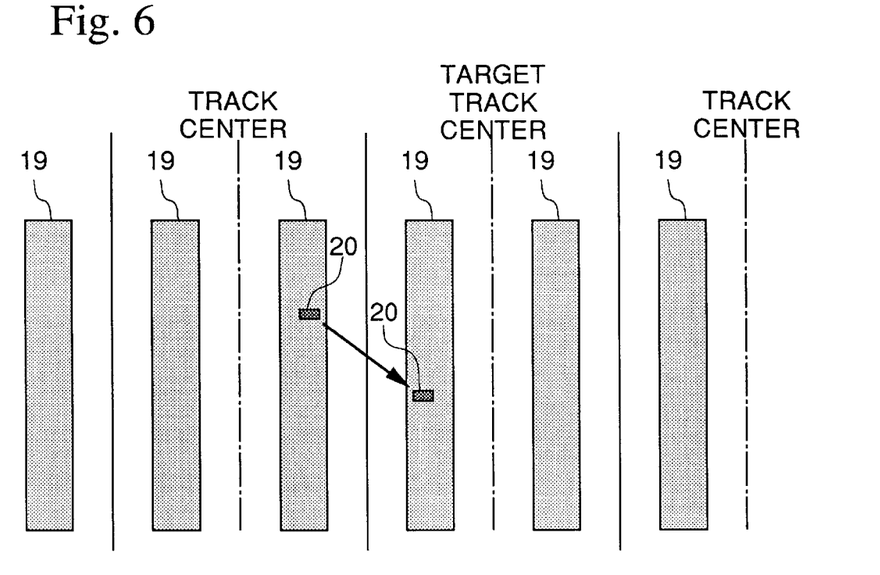
FIG. 6 is a diagram showing the second embodiment of the head movement executed in the head control method of the present invention applied to the positioning control device shown in FIG. 1.
Figure 7:
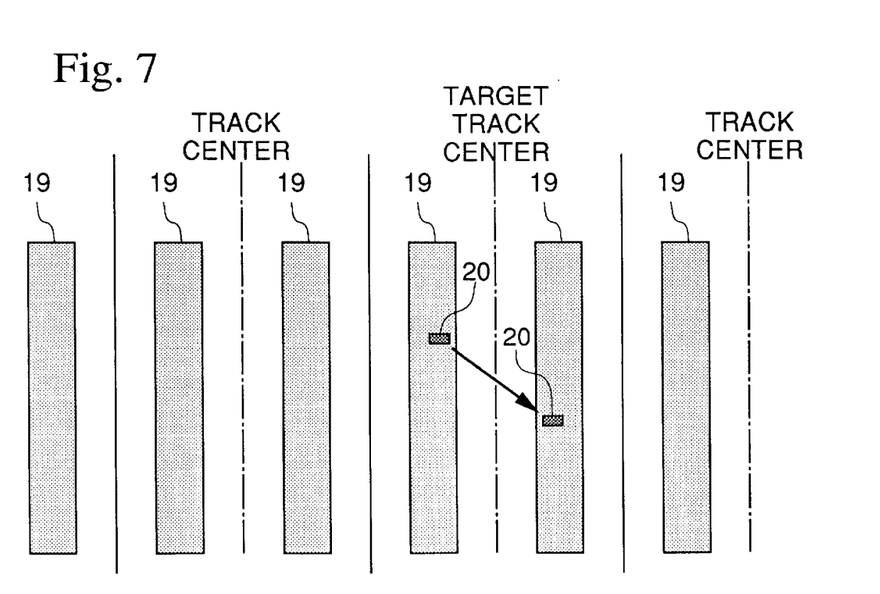
FIG. 7 is a diagram showing the third embodiment of the head movement executed in the head control method of the present invention applied to the positioning control device shown in FIG. 1.

FIG. 5 shows a first embodiment of the movement of the magnetic head executed in the head control method of the present invention for the positioning control device shown in FIG. 1. FIG. 6 shows a second embodiment of the movement of the magnetic head executed using the head control method of the present invention for the positioning control device shown in FIG. 1, and FIG. 7 shows a third embodiment of the movement of the magnetic head executed using the head control method of the present invention for the positioning control device shown in FIG. 1.

When the magnetic head is located on a track other than the target track (FIG. 5), the position error signal generator 3 generates a position error signal 10 which is the same as the signal generated when the magnetic head is located at the center of the dead zone, so that the settling time is reduced. Similarly, when the track number 9 acquired at a sample time differs from the track number 9 obtained at the previous sample time (FIG. 6), the position error signal generator 3 generates a position error signal 10 which is the same as the signal generated when the magnetic head is located at the center of the dead zone, so that the settling time is reduced.

When the magnetic head is on the target track, and when the track number 9 obtained at the previous time is the same as that 9 obtained at the present sampling time (FIG. 7), the position signal, indicating that the magnetic head is located in the dead zone and at the position closest to the target track center, is output. As a result, the overshoot of the position error signal from the position error detection area in the vicinity of the track center after changing from the seek mode can be reduced and the limit cycle in the vicinity of the track center can be eliminated.

An example of an operation in the settling mode is described with reference to FIG. 1. The change from the seek mode to the settling mode is executed in the position error detection region on the adjacent track or on the target track. If the dead zone 19 of the target track is wide, the mode may be switched at the same time that the magnetic head reaches the dead zone of the target track.

If the magnetic head 2 is located in the position error detection circuit when the mode is switched to the settling mode, the position error signal is generated by the obtained servo signal 8. If the magnetic head 2 is in the dead zone 19, the relative position of the dead zone with respect to the track center of the track on which the magnetic head is located is determined by the obtained track number and the A-B position error signal. If the obtained track number 9 differs from the target track number, or if the obtained track number 9 differs from the track number at the previous sample time, a position error signal 10 is output which corresponds to the signal when the magnetic head is at the center position of the dead zone.

The position error signal 10 corresponding to the center position of the dead zone is generated by judging the positional relationship between the track center on which the magnetic head is located and the dead zone 19, by the comparison with the amount of positional error between the center of the dead zone 19 and the track center on the same track stored in a memory. When the magnetic head is located on the other track, since the track number is input into the phase compensator (the phase compensation filter), the positional error due to the difference in the track number can be judged normally inside of the phase compensator.

In contrast, if the magnetic head is on the target track and if the track number obtained by the previous sample time is the same as the obtained track number, the positional error signal 10 at the closest position of the target track center in the dead zone is generated. Such a positional error signal 10 can be output by addition of the positional code showing which side the magnetic head is located with respect to the track center to the minimum value of the positional error between the track center and the dead zone 19 stored in a memory 7.

As described above, when the magnetic head 2 is in the dead zone, the settling motion is executed, the mode is changed to the follow mode after determining for several sample times that the magnetic head 2 is following in the vicinity of the target track center by use of two stored values.

Summarizing the above-described present embodiment, when the magnetic head is in the dead zone 19 and the target track center and the head position 20 are separated, it is possible to improve the positioning speed by making the center position of the dead zone to be the head position; and when the magnetic head is in the dead zone in the vicinity of the target track center, it is also possible to prevent the limit cycle by making the position close to the dead zone center of the target track to the head position.

It is noted that the present invention is not limited to the above-described embodiment, and the present invention can be applied to the magnetic head used for storing or reading data in any magnetic recording medium to which the present invention is suitably applied. It is also noted that the number, position, and shape of the above constituting elements is not limited to the above embodiment, and any number, position and shape can be adopted which is suitable for executing the present invention. It should be noted that the same numbers denote same constituting elements in each of the figures.

The effects of the present invention are that it is possible to improve the positioning speed when the magnetic head is in the dead zone by setting the head position at the center position of the dead zone; and that it is also possible to prevent the limit cycle when the magnetic head is near the track center of the dead zone by setting the head position at the vicinity of the target track center of the dead zone.

What is claimed is:

1. A positioning control device for controlling positioning of a head that reads and writes on a medium comprising:

a position error signal generating device for generating the position error signal for obtaining the position of the dead zone, when the head is in said dead zone in which the change of the position error signal is within a specified range or the position error signal does not change, even if said head moves, based on a combination of burst signals for generating a position error signal which indicates a relative position of said head to said medium; and a phase compensation filter that receives the position error signal and a track number, and outputs an actuator control signal to an actuator, which results in ensuring stability in the positioning of said head that reads and writes on the changeable medium.

2. A positioning control device according to claim 1, wherein, if said head is located at a position separated more than a half track to the target track center, the positioning control device determines that the head position is present at the center portion of said dead zone.

3. A positioning control device according to claim 1, wherein, if said head is located at a position closer than a half track to the target track center, and when the track number of said head changes as a result of obtaining two samples of servo signals, the positioning control device determines that the head position is located at the center region of the dead zone.

4. A positioning control device according to claim 1, wherein, if said head is located at a position closer than a half track to the target track center, and when the track number of said head does not change as a result of obtaining two samples of servo signals, the positioning control device determines that the head position is located at a position closest to the target track center of the dead zone.

5. A positioning control device according to claim 1, wherein said positioning control device comprises a head for reading and writing on the exchangeable medium.

6. A method of controlling positioning of a head which executes reading and writing on the medium, the method comprises:

generating a position error signal by obtaining the position of the dead zone, when the head is in said dead zone in which the change of the position error signal is within a specified range or the position error signal does not change, even if said head moves, based on a combination of burst signals for generating a position error signal which indicates a relative position of said head to said medium; and performing phase compensation by receiving said position error signal and track number, and outputting an actuator signal.

7. A method of controlling the position of said head according to claim 6, wherein, if said head is located at a position separated by more than a half track from the target track center, the head position is determined to be present at the center portion of said dead zone.

8. A method of controlling the position of the head according to claim 7, wherein, if said head is located at a position closer than a half track to the target track center, and if the track number of said head does not change as a result of obtaining two samples of servo signals, the positioning control device determines that the head position is located at a position closest to the target track center of the dead zone.

9. A method of controlling positioning of a head which executes reading and writing on the medium, the method comprises:

generating a position error signal by obtaining the position of the dead zone, when the head is in said dead zone in which the change of the position error signal is within a specified range or the position error signal does not change, even if said head moves, based on a combination of burst signals for generating a position error signal which indicates a relative position of said head to said medium and a track number written on said medium; and performing phase compensation by receiving said position error signal and track number, and outputting an actuator signal.

10. A method of controlling the position of the head according to claim 8, wherein, if said head is located at a position closer than a half track to the target track center, and if the track number of said head does not change as a result of obtaining two samples of servo signals, the positioning control device determines that the head position is located at a position closest to the target tract center of the dead zone.

11. A positioning control device for controlling positioning of a head that reads and writs a medium comprising:

a position error signal generating device for generating the position error signal for obtaining the position of the dead zone, when the head is in said dead zone in which the change of the position error signal is within a specified range or the position error signal does not change, even if said head moves, based on a combination of the burst signals for generating a position error signal which indicates a relative position of said head to said medium and a track number written on said medium; and a phase compensation filter that receives the position error signal and a track number, and outputs an actuator control signal to an actuator, which results in ensuring stability in the positioning of said head that reads and writes on the changeable medium.

12. A positioning control device according to claim 11, wherein, if said head is located at a position separated more than a half track to the target track center, the positioning control device determines that the head position is present at the center portion of said dead zone.

13. A positioning control device according to claim 11, wherein, if said head is located at a position closer than a half track to the target track center, and when the track number of said head changes as a result of obtaining two samples of servo signals, the positioning control device determines that the head position is located at the center region of the dead zone.

14. A positioning control device according to claim 11, wherein, if said head is located at a position closer than a half track to the target track center, and when the track number of said head does not change as a result of obtaining two samples of servo signals, the positioning control device determines that the head position is located at a position closest to the target track center of the dead zone.

15. A positioning control device according to claim 11, wherein said positioning control device comprises a head for reading and writing on the exchangeable medium.

* * * * *

UNITED STATES PATENT AND TRADEMARK OFFICE
CERTIFICATE OF CORRECTION

PATENT NO. : 6,560,058 B1
DATED : May 6, 2003
INVENTOR(S) : Hattori

It is certified that error appears in the above-identified patent and that said Letters Patent is hereby corrected as shown below:

<u>Title page,</u>
Item 57, ABSTRACT,
Line 3, "on both sizes of" should be -- on both sizes of --.

<u>Column 9,</u>
Line 7, "according to claim 7" should be -- according to claim 6 --.
Line 36, "writs" should be -- writes --.

Signed and Sealed this

Thirty-first Day of August, 2004

JON W. DUDAS
*Director of the United States Patent and Trademark Office*

UNITED STATES PATENT AND TRADEMARK OFFICE
CERTIFICATE OF CORRECTION

PATENT NO. : 6,560,058 B1
DATED : May 6, 2003
INVENTOR(S) : Hattori

It is certified that error appears in the above-identified patent and that said Letters Patent is hereby corrected as shown below:

Title page,
Item [57], ABSTRACT,
Line 3, "on both sizes of" should be -- on both sides of --.

Column 9,
Line 7, "according to claim 7" should be -- according to claim 6 --.
Line 36, "writs" should be -- writes --.

This certificate supersedes Certificate of Correction issued August 31, 2004.

Signed and Sealed this

Seventh Day of December, 2004

JON W. DUDAS
*Director of the United States Patent and Trademark Office*